United States Patent
Kato

(10) Patent No.: US 11,948,038 B2
(45) Date of Patent: Apr. 2, 2024

(54) RFIC MODULE AND RFID TAG

(71) Applicant: Murata Manufacturing Co., Ltd., Nagaokakyo (JP)

(72) Inventor: Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 359 days.

(21) Appl. No.: 17/355,804

(22) Filed: Jun. 23, 2021

(65) Prior Publication Data
US 2021/0319278 A1    Oct. 14, 2021

Related U.S. Application Data

(63) Continuation of application No. PCT/JP2020/031304, filed on Aug. 19, 2020.

(30) Foreign Application Priority Data

Dec. 23, 2019    (JP) .................................. 2019-231465

(51) Int. Cl.
  *H01Q 1/22*    (2006.01)
  *G06K 19/07*    (2006.01)
  *G06K 19/077*    (2006.01)

(52) U.S. Cl.
  CPC ... G06K 19/07777 (2013.01); G06K 19/0723 (2013.01); H01Q 1/2225 (2013.01); *G06K 19/07758* (2013.01); *G06K 19/07786* (2013.01)

(58) Field of Classification Search
  CPC ...... H01Q 1/22; H01Q 1/2208; H01Q 1/2225; H01Q 1/38; G06K 19/077; G06K 19/0772;
  (Continued)

(56) References Cited

U.S. PATENT DOCUMENTS

2009/0278687 A1    11/2009 Kato
2014/0361089 A1*  12/2014 Kai .................. G06K 19/07786
                                                                235/492
(Continued)

FOREIGN PATENT DOCUMENTS

JP        H10193851 A    7/1998
JP        2007073611 A    3/2007
(Continued)

OTHER PUBLICATIONS

International Search Report issued for PCT/JP2020/031304, dated Oct. 27, 2020 (Japanese language).

*Primary Examiner* — Thai Pham
(74) *Attorney, Agent, or Firm* — ArentFox Schiff LLP

(57) ABSTRACT

An RFIC module is provided that includes a base material having a first surface and a second surface opposite to each other; an RFIC mounted on a first surface side of the base material; a first conductor pattern formed on the first surface of the base material; a first insulator film formed on the first surface of the base material and a surface of the first conductor pattern; a second conductor pattern formed on the first insulator film and the first conductor pattern; and a second insulator film covering a surface side of the base material with respect to the first surface. Moreover, the first and second conductor patterns form a circuit connected between RFIC-side electrodes to which the RFIC is connected and antenna-side electrodes facing an antenna conductor pattern.

19 Claims, 8 Drawing Sheets

(58) Field of Classification Search
CPC ......... G06K 19/0723; G06K 19/07758; G06K 19/07786; G06K 19/07; G06K 19/07745; G06K 19/07747
See application file for complete search history.

(56) References Cited

U.S. PATENT DOCUMENTS

| | | | |
|---|---|---|---|
| 2017/0083804 A1* | 3/2017 | Kato | G06K 19/07786 |
| 2018/0019054 A1* | 1/2018 | Tenno | H01F 17/0006 |
| 2018/0114104 A1 | 4/2018 | Kato et al. | |
| 2021/0034939 A1* | 2/2021 | Ueki | G06K 19/0723 |
| 2021/0159601 A1* | 5/2021 | Ueki | G06K 19/02 |
| 2022/0237427 A1* | 7/2022 | Kato | G06K 19/07747 |

FOREIGN PATENT DOCUMENTS

| | | | |
|---|---|---|---|
| JP | 2009266134 A | 11/2009 | |
| WO | 2008126458 A1 | 10/2008 | |
| WO | 2016084658 A1 | 6/2016 | |

\* cited by examiner

RFIC MODULE AND RFID TAG

CROSS REFERENCE TO RELATED APPLICATIONS

The present application is a continuation of PCT/JP2020/031304 filed Aug. 19, 2020, which claims priority to Japanese Patent Application No. 2019-231465, filed Dec. 23, 2019, the entire contents of each of which are incorporated herein by reference.

TECHNICAL FIELD

The present invention relates to a Radio Frequency Integrated Circuit (RFIC) module and a Radio Frequency Identifier (RFID) tag including the same.

BACKGROUND

An RFID system including an RFID tag attached to an article and a reader/writer that performs reading and writing on the RFID tag and is configured as an article information management system.

In general, WO 2016/084658 A (hereinafter "Patent Literature 1") discloses an RFID tag that includes a conductor to serve as an antenna, and an RFIC module that is coupled to the antenna.

Such an RFID tag includes an RFIC chip that stores predetermined information and processes a predetermined wireless signal, and an antenna element (e.g., an emitter) that transmits and receives a high frequency signal, and is used while being affixed to various articles (or packaging materials thereof) as a management target.

The management target includes various articles, which are increasingly expanding in variety. When the size of the article is small, the RFID tag becomes relatively large with respect to the article. In some such cases, a method for attachment to the article becomes problematic.

SUMMARY OF THE INVENTION

In order to downsize the RFID tag, it is important to reduce the area of an RFIC module connected to an antenna conductor. Therefore, it is an object of the exemplary embodiments disclosed herein to provide an RFIC module with which an RFID tag can be downsized, and an RFID tag including the RFIC module.

An RFIC module according to an exemplary embodiment includes a base material having a first surface and a second surface opposite to each other; an RFIC mounted on a first surface side of the base material; a first conductor pattern formed on the first surface of the base material; a first insulator film formed by printing on the first surface of the base material and a surface of the first conductor pattern; a second conductor pattern formed by printing on the first insulator film and the first conductor pattern; and a second insulator film covering a surface side of the base material with respect to the first surface. Moreover, the first conductor pattern and the second conductor pattern form a circuit connected between an RFIC-side electrode connected to the RFIC and an antenna-side electrode facing an antenna conductor pattern.

Moreover, an RFIC module according to an exemplary embodiment includes a base material having a first surface and a second surface opposite to each other; an RFIC mounted on a first surface side of the base material; a first conductor pattern formed on the first surface of the base material; a first insulator film formed by printing on the first surface of the base material and a surface of the first conductor pattern; a second conductor pattern formed by printing on the first insulator film and the first conductor pattern; a second insulator film covering a surface side of the base material with respect to the first surface; an antenna connection terminal electrode formed on the second surface of the base material; and an interlayer connection conductor electrically connecting the first conductor pattern and the antenna connection terminal electrode. Moreover, the first conductor pattern, the second conductor pattern, and the interlayer connection conductor form a circuit connected between an RFIC-side electrode connected to the RFIC and the antenna connection terminal electrode.

In any of the configurations described above, the circuit connected between the RFIC side electrodes and the antenna-side electrodes or the main part of the circuit connected between the RFIC-side electrode and the antenna connection terminal electrode is formed by the first conductor pattern and the second conductor pattern overlapping in the lamination direction. Thus, the occupying area of the RFIC module is reduced, and a small RFIC module can be formed compared with existing RFIC modules. In addition, since the conductor pattern on the upper layer of the circuit connected between the RFIC-side electrode and the antenna-side electrode is formed by printing, for example, manufacturing can be performed at a cost lower than where a flexible multilayer substrate is used using a through-hole electrode or a via hole electrode that electrically connects electrode layers.

In general, a flexible multilayer substrate is formed as follows. Specifically, a through hole is formed in a plate (e.g., a panel) having a predetermined size and having a Cu foil bonded to both surfaces, electrodes are electrically connected by Cu plating, and then a patterned circuit board is laminated on the Cu foil. In such a method, the processing is performed on individual panel, and thus mass production is difficult with the method. Furthermore, it is difficult to lower the unit price per unit area of the flexible multilayer substrate. In addition, a method of forming a flexible multilayer substrate by printing an electrode paste on a flexible base material has also been proposed, but since the conductivity of the conductive paste is low and the wiring width cannot be narrowed, a low resistance circuit board, such as a flexible base material formed of a Cu foil, cannot be formed. To solve these problems, the exemplary embodiments of the present invention provide an RFIC module in which an RFIC module to be bonded to various objects is configured at low cost, and the RFIC module is attached to the objects with an insulating adhesive to solve the problems related to the attachment.

According to an exemplary embodiment, an RFID tag is provided that includes an antenna; and an RFIC module. The antenna includes an antenna base material and an antenna conductor pattern formed on the antenna base material. Moreover, the RFIC module includes a base material having a first surface and a second surface opposite to each other; an RFIC mounted on a first surface side of the base material; a first conductor pattern formed on the first surface of the base material; a first insulator film formed by printing on the first surface of the base material and a surface of the first conductor pattern; a second conductor pattern formed by printing on the first insulator film and the first conductor pattern; and a second insulator film covering a surface side of the base material with respect to the first surface. In addition, the first conductor pattern and the second conductor pattern form a circuit connected between an RFIC-side electrode to which the RFIC is connected and an antenna-side electrode facing an antenna conductor pattern.

Yet further, according to an exemplary embodiment an RFID tag is provided that includes an antenna; and an RFIC module. The antenna includes an antenna base material and an antenna conductor pattern formed on the antenna base material. The RFIC module includes a base material having a first surface and a second surface opposite to each other; an RFIC mounted on a first surface side of the base material; a first conductor pattern formed on the first surface of the base material; a first insulator film formed by printing on the first surface of the base material and a surface of the first conductor pattern; a second conductor pattern formed by printing on the first insulator film and the first conductor pattern; and a second insulator film covering a surface side of the base material with respect to the first surface; an antenna connection terminal electrode formed on the second surface of the base material; and an interlayer connection conductor electrically connecting the first conductor pattern and the antenna connection terminal electrode. Moreover, the first conductor pattern, the second conductor pattern, and the interlayer connection conductor form a circuit connected between an RFIC-side electrode to which the RFIC is connected and the antenna connection terminal electrode.

In any of the configurations described above, the circuit connected between the RFIC side electrodes and the antenna-side electrodes or the main part of the circuit connected between the RFIC-side electrode and the antenna connection terminal electrode is formed by the first conductor pattern and the second conductor pattern overlapping in the lamination direction. Thus, the occupying area of the RFIC module is reduced, and the small RFIC module can be formed compared with existing RFIC module designs. Furthermore, the manufacturing can be implemented at a cost lower than that in a case where the circuit is formed on a flexible multilayer substrate for example.

With the exemplary embodiments of the present invention, an RFIC module with which an RFID tag can be downsized, and an RFID tag including the RFIC module is provided.

DETAILED DESCRIPTION OF EMBODIMENTS

Figure 1A:
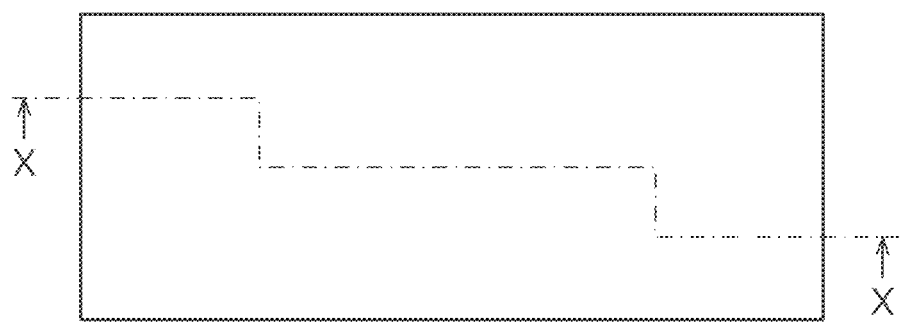
FIG. 1A is a plan view of an RFIC module 101 according to a first exemplary embodiment.

Hereinafter, a plurality of exemplary embodiments according to the present invention will be described with some specific examples with reference to the drawings. In each drawing, the same parts are designated by the same reference numerals. Although embodiments are described separately, for convenience of the description of the embodiments, in consideration of the description of main points or the ease of understanding, configurations described in different embodiments can be partially replaced or combined. In second and subsequent embodiments, a description of matters common to a first embodiment will be omitted, and only different points will be described. In particular, similar effects obtained by a similar configuration will not be sequentially described for each embodiment.

First Exemplary Embodiment

Figure 1B:
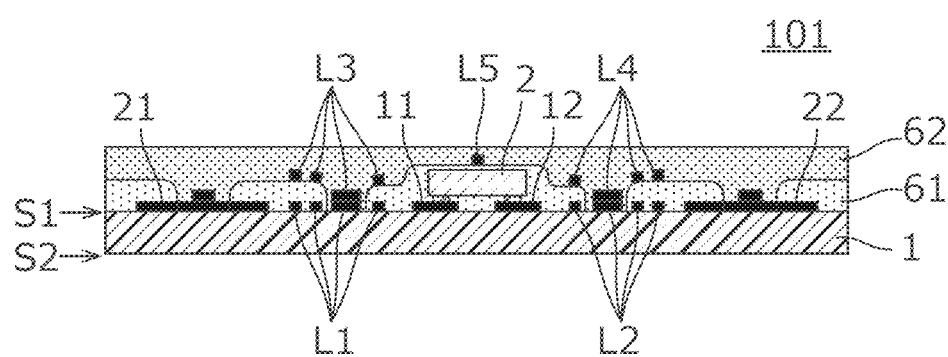
FIG. 1B is a vertical cross-sectional view of an X-X portion in FIG. 1A.
Figure 2:
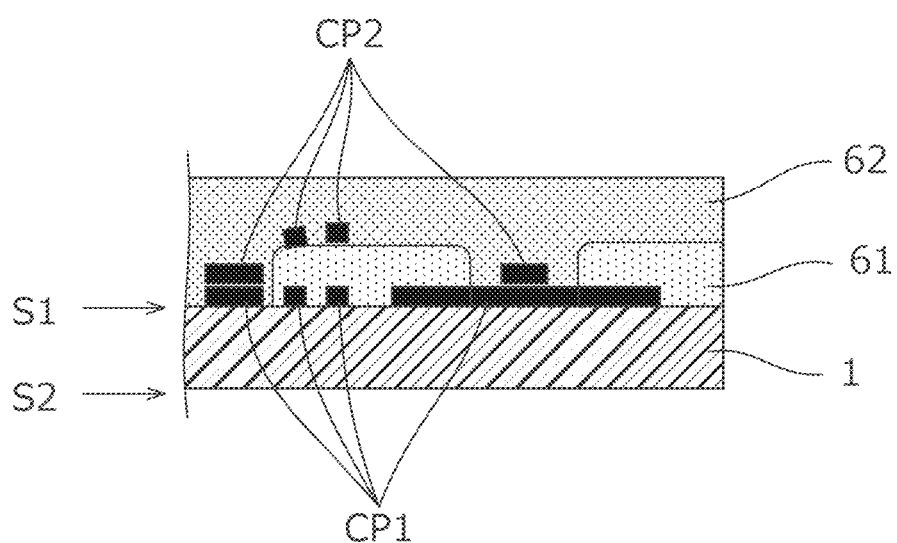
FIG. 2 is a partially enlarged view of FIG. 1B.

FIG. 1A is a plan view of an RFIC module 101 according to a first embodiment, and FIG. 1B is a vertical cross-sectional view of an X-X portion in FIG. 1A. FIG. 2 is a partially enlarged view of FIG. 1B. An X-X portion in FIG. 1A corresponds to an X-X portion in FIG. 3 described later.

As illustrated in FIG. 1B, the RFIC module 101 includes a base material 1 having a first surface S1 and a second surface S2 opposite to each other, and an RFIC 2 mounted on the first surface S1 side of the base material 1. In addition, as illustrated in FIG. 2, the RFIC module 101 includes a first conductor pattern CP1 formed on the first surface S1 of the base material 1, a first insulator film 61 formed by printing on the first surface S1 of the base material 1 and a surface of the first conductor pattern CP1, a second conductor pattern CP2 formed by printing on the first insulator film 61 and the first conductor pattern CP1, and a second insulator film 62 covering the surface side of the base material 1 with respect to the first surface S1.

The base material 1 is a resin sheet having a thickness of about 20 μm to 60 μm (for example, 25 μm), and is, for example, a polyethylene terephthalate (PET) or polyimide (PI) sheet. The first conductor pattern CP1 is a Cu pattern having a thickness of about 5 μm to 25 μm (for example, 18 μm), and is, for example, a patterned Cu foil according to an exemplary aspect. The second conductor pattern CP2 is, for example, a conductor pattern formed by forming an Ag paste by printing and forming a Cu film on the surface thereof by plating according to an exemplary aspect. The Ag paste is a pattern having a thickness of 1 μm to 10 μm (for example, 3 μm), and the Cu film is a plated film having a thickness of 10 μm to 30 μm (for example, 15 μm). By forming the surface of the second conductor pattern CP2 as the Cu plated film as described above, the conductivity of the second conductor pattern CP2 is increased, and the DC resistance (DCR) of the inductor can be reduced.

The first insulator film 61 is, for example, various resist films of epoxy type, polyester type, and the like. The second insulator film 62 is, for example, a resist film such as polyurethane, or a hot melt resin such as ethylene-vinyl acetate-based, olefin-based, rubber-based, polyamide-based, or polyurethane-based resin.

Figure 3:
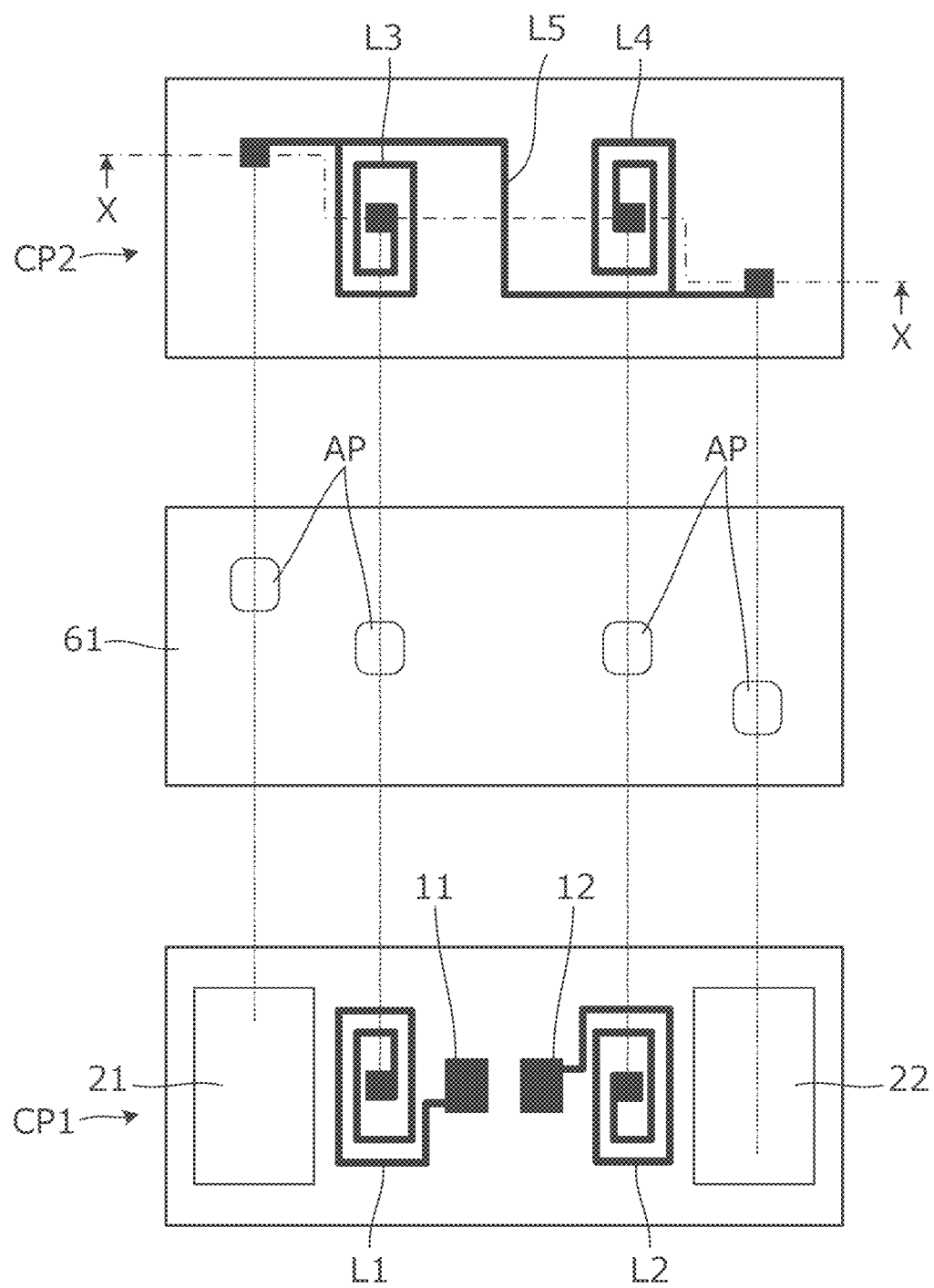
FIG. 3 is a plan view of a first conductor pattern CP1, a first insulator film 61, and a second conductor pattern CP2 of the RFIC module 101.

FIG. 3 is a plan view of the first conductor pattern CP1, the first insulator film 61, and the second conductor pattern CP2 of the RFIC module 101. The first conductor pattern CP1 forms RFIC-side electrodes 11 and 12, inductors L1 and L2, and antenna-side electrodes 21 and 22. The first insulator film 61 covers the entire surface of the first surface S1 of the base material 1, while having openings AP formed in parts thereof. Moreover, the second conductor pattern CP2 forms inductors L3, L4, and L5.

In this configuration, the first conductor pattern CP1 and the second conductor pattern CP2 form a circuit connected between the RFIC-side electrodes 11 and 12 to which the RFIC 2 is connected and the antenna-side electrodes 21 and 22 facing the antenna conductor pattern.

Figure 4A:
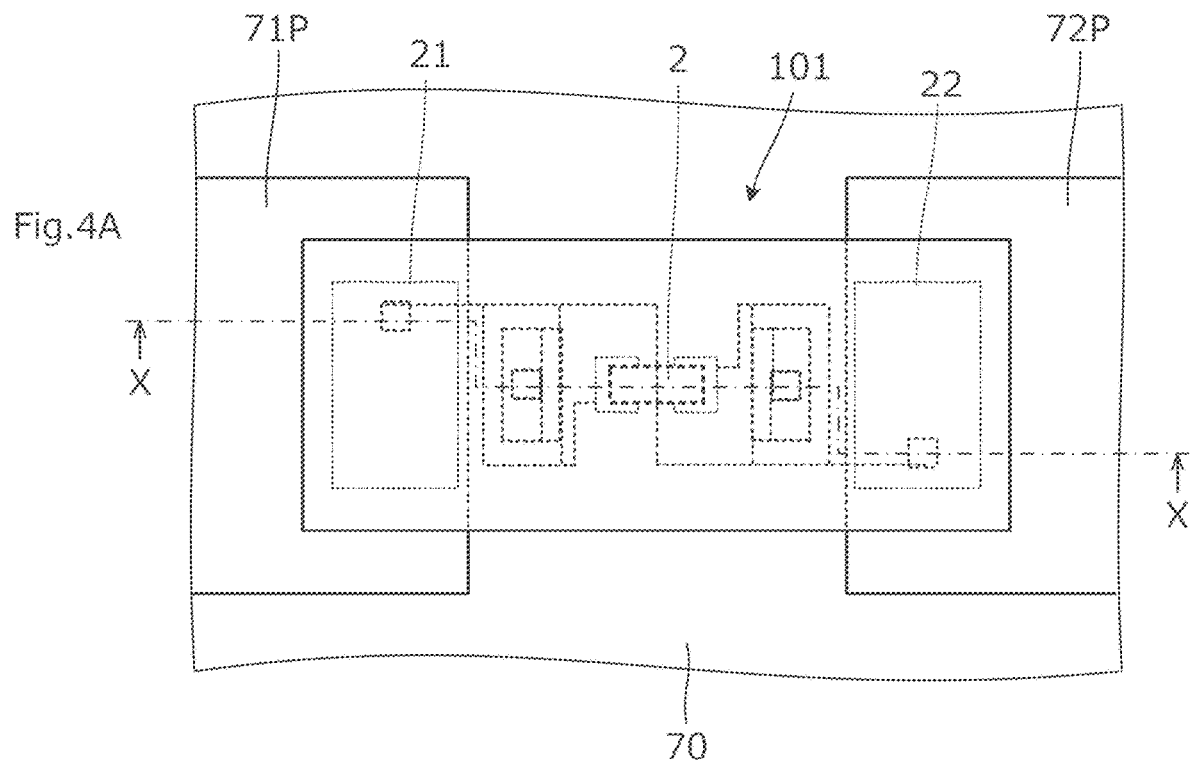
FIG. 4A is a plan view of the RFIC module 101 mounted on an antenna 9.
Figure 4B:
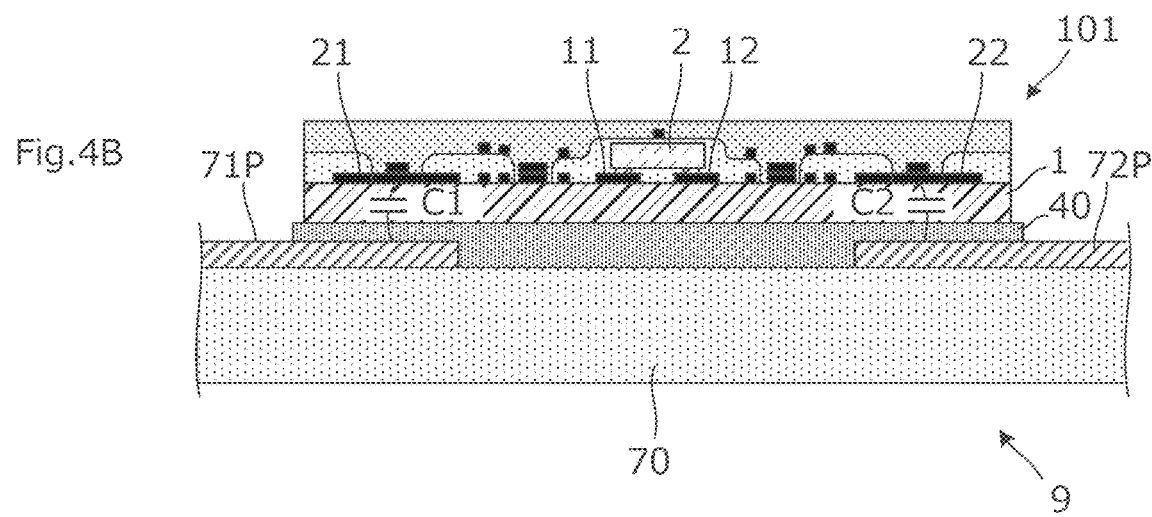
FIG. 4B is a vertical cross-sectional view of an X-X portion in FIG. 4A.

FIG. 4A is a plan view of the RFIC module 101 mounted on an antenna 9. FIG. 4B is a vertical cross-sectional view of an X-X portion in FIG. 4A. The antenna 9 includes an antenna base material 70 and a conductor pattern formed on the antenna base material 70. The entire conductor pattern formed on the antenna base material 70 will be described later.

In FIGS. 4A and 4B, antenna conductors 71P and 72P have end portions facing each other along the surface of the antenna base material 70. The RFIC module 101 is mounted at the position where the antenna conductors 71P and 72P face each other. In this example, the lower surface of the RFIC module 101 (i.e., the lower surface of the base material 1) is joined to the antenna base material 70 (i.e., on the antenna conductors 71P and 72P) via a joining material 40. The joining material 40 is, for example, an insulating adhesive. In this state, capacitance C1 is formed between the antenna-side electrode 21 and the antenna conductor 71P, and capacitance C2 is formed between the antenna-side electrode 22 and the antenna conductor 72P.

Figure 5:
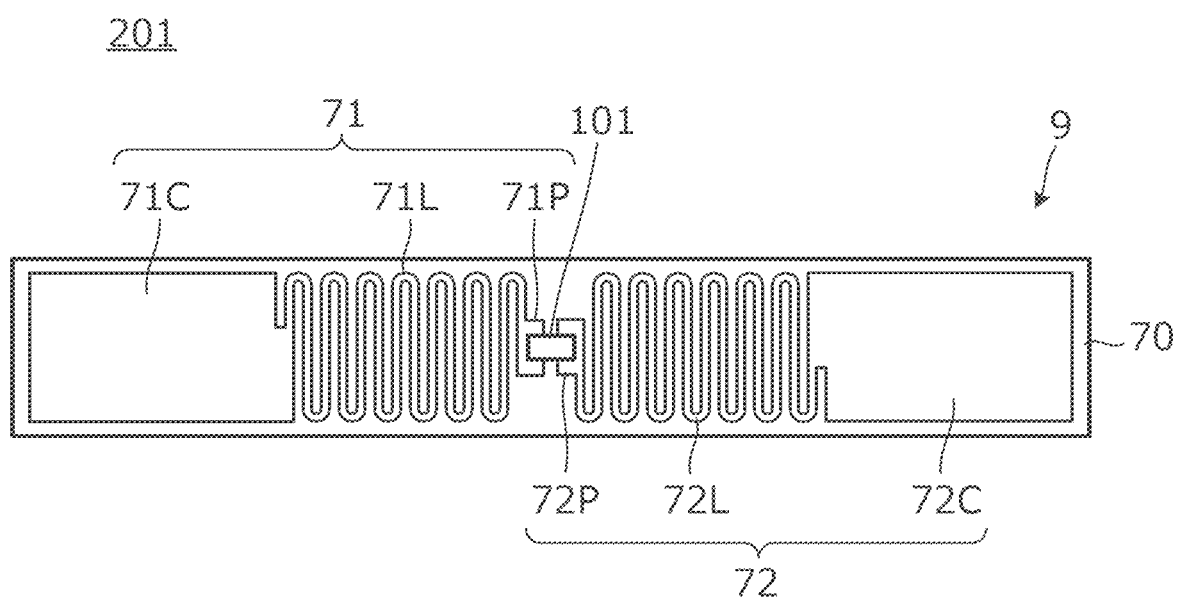
FIG. 5 is a plan view of an RFID tag 201 according to the first embodiment.

FIG. 5 is a plan view of an RFID tag 201 according to the first embodiment. As shown, the RFID tag 201 includes the antenna 9 and the RFIC module 101 coupled to the antenna 9. The antenna 9 includes the antenna base material 70 and antenna conductor patterns 71 and 72 formed on the antenna base material 70. It is noted that the antenna conductor patterns 71 and 72 correspond to the antenna conductor pattern according to the present disclosure. The antenna base material 70 is, for example, a polyethylene terephthalate (PET) film, and the antenna conductor patterns 71 and 72 are, for example, aluminum foil patterns.

The antenna conductor pattern 71 includes antenna conductors 71P, 71L, and 71C, and the antenna conductor pattern 72 includes antenna conductors 72P, 72L, and 72C. The antenna conductor patterns 71 and 72 form a dipole antenna in the exemplary embodiment.

Moreover, the RFIC module 101 is mounted on the antenna conductors 71P and 72P. The antenna conductors 71L and 72L have a meander line shape and serve as a high inductance component region. On the other hand, the antenna conductors 71C and 72C have a planar shape and serve as a high capacitance component region. With this configuration, the formation region where the antenna conductor patterns 71 and 72 are formed is downsized, with an inductance component provided in a high current intensity region increased and with a capacitance component provided in a high voltage intensity region increased. This also contributes to downsizing of the antenna 9.

In addition, the antenna base material 70 in FIG. 5 may be formed of a paper base material, and the antenna conductor patterns 71 and 72 may be formed by printing a conductive paste or may be formed of a metal deposited foil having a metal film thickness of only several 10 to several 100 angstroms according to exemplary aspects. The antenna conductor patterns 71 and 72 formed of these materials have a resistivity that is about 10 times to 1000 times higher than that of the antenna conductor formed of aluminum foil. Thus, the antenna conductor itself forms a standing wave and is difficult to operate as an antenna. However, since the RFIC module 101 is formed of a low-resistance metal material and resonates, the center frequency of the antenna is determined by the RFIC module 101, and the antenna conductor patterns 71 and 72 can serve as a radiating plate and radiate energy.

Figure 6:
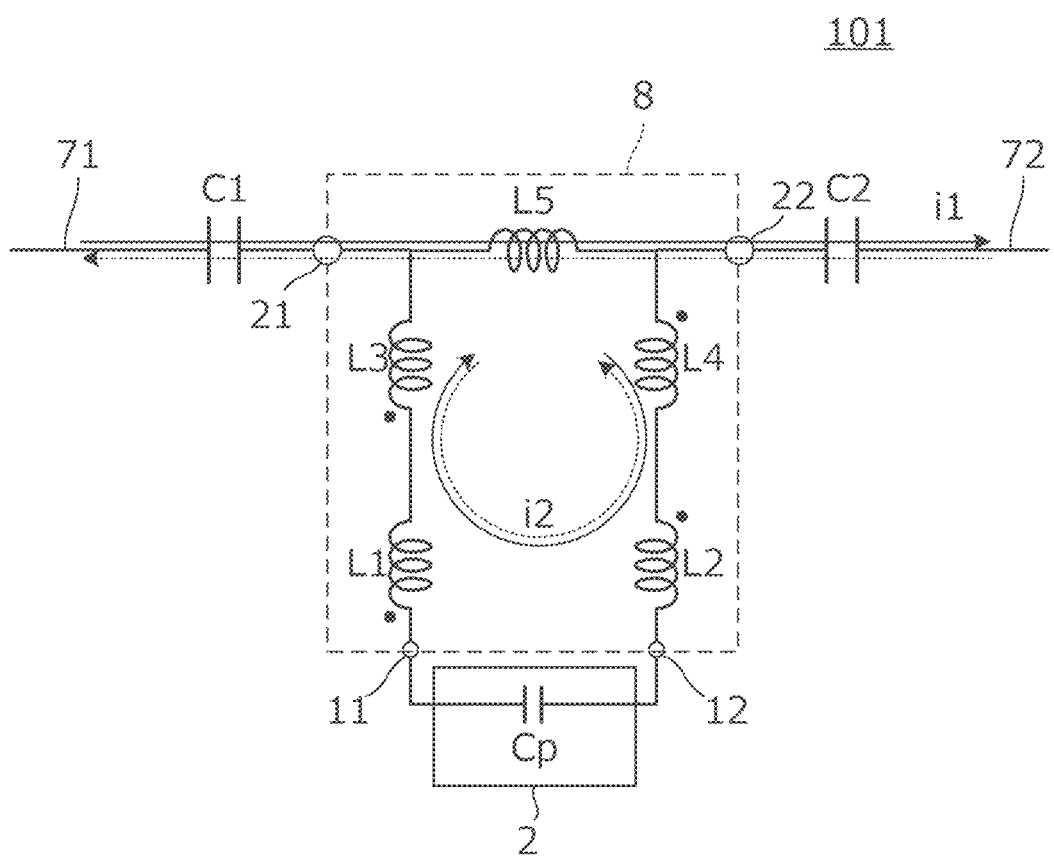
FIG. 6 is a circuit diagram of the RFIC module 101.
Figure 7:
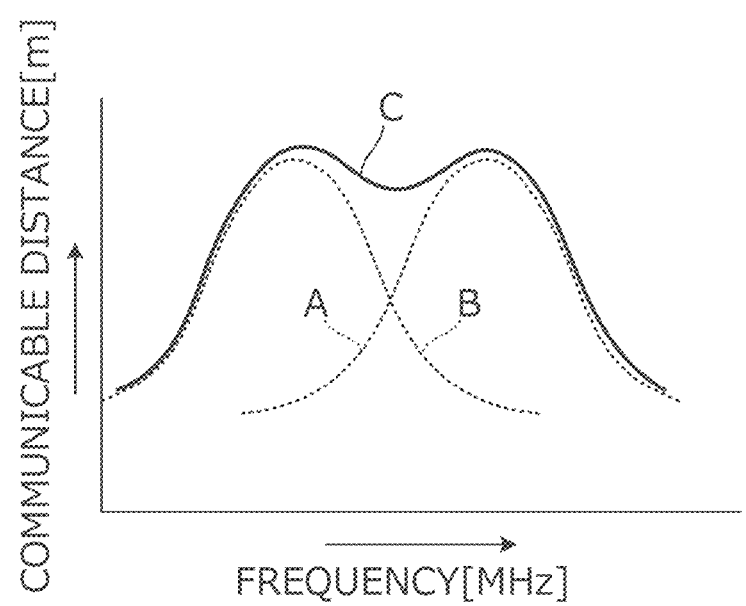
FIG. 7 is a diagram illustrating two resonance frequencies generated by a matching circuit.

FIG. 6 is a circuit diagram of the RFIC module 101. FIG. 7 is a diagram illustrating two resonance frequencies generated by a matching circuit. The RFIC module 101 includes the RFIC 2 and a matching circuit 8. The matching circuit 8 is connected to the RFIC-side electrodes 11 and 12 and the antenna-side electrodes 21 and 22. The matching circuit 8 includes a first inductor L1, a second inductor L2, a third inductor L3, a fourth inductor L4, and a fifth inductor L5. The capacitance C1 and the capacitance C2 in FIG. 6 correspond to the capacitance C1 and the capacitance C2 illustrated in FIG. 4B.

In the RFIC 2, a capacitor Cp exists due to an internal circuit, parasitic capacitance, and the like. In a state where the matching circuit 8 is connected to the RFIC 2, two resonances occur as illustrated in FIG. 7. The first resonance is a resonance generated in a current path including the antenna conductor patterns 71 and 72 and the inductor L5, and the second resonance is a resonance generated in a current path (e.g., a current loop) including the inductors L1 to L5 and the capacitor Cp. The two resonances are coupled by the inductor L5 shared by the current paths, and two currents i1 and i2 respectively corresponding to the two resonances flow as illustrated in FIG. 6.

The two resonance frequency characteristics are expressed by a curve A and a curve B in FIG. 7. By combining two resonances having such resonance frequencies, a broadband resonance frequency characteristic as indicated by curve C in FIG. 7 can be obtained.

According to the present embodiment, the matching circuit connected between the RFIC side electrodes 11 and 12 and the antenna-side electrodes 21 and 22 is formed by the first conductor pattern CP1 and the second conductor pattern CP2 overlapping in the lamination direction. Thus, the occupying area of the RFIC module 101 is reduced, and the small RFIC module 101 can be formed. Since the conductor pattern on the upper layer of the matching circuit is formed by printing, manufacturing can be implemented at a cost lower than that in a case of using a flexible multilayer substrate for example.

Second Exemplary Embodiment

In a second exemplary embodiment, an RFIC module and an RFID tag in which a connection structure between the RFIC module and an antenna conductor is different from that in the first embodiment will be described.

Figure 8:
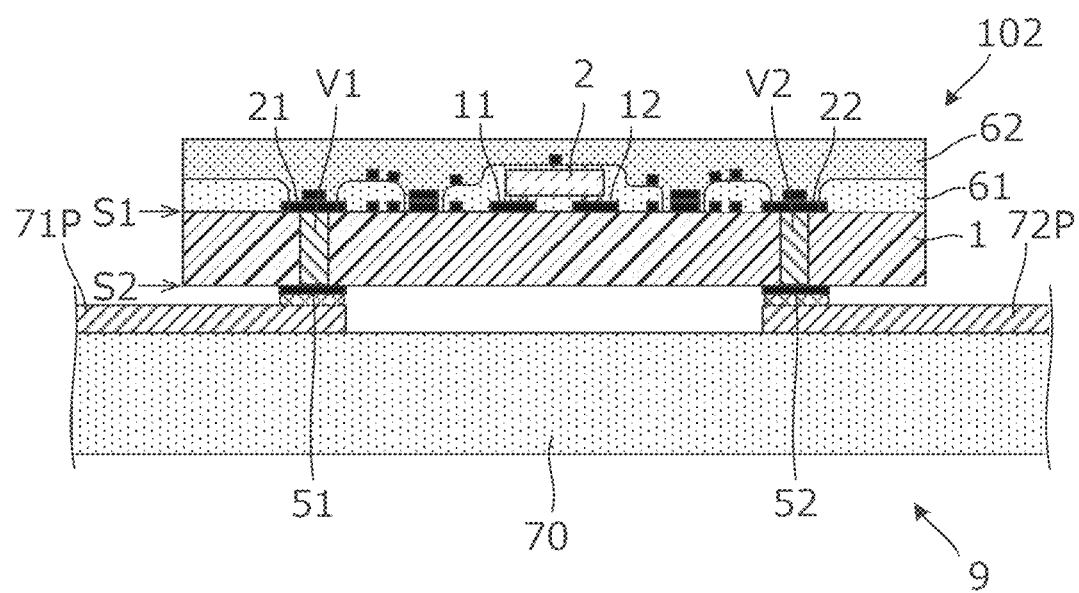
FIG. 8 is a diagram illustrating a cross-sectional structure of an RFIC module 102 and a cross-sectional structure of an RFID tag according to the second exemplary embodiment.

FIG. 8 is a diagram illustrating a cross-sectional structure of an RFIC module 102 and a cross-sectional structure of the RFID tag according to the second embodiment. The RFIC module 102 includes a base material 1 having a first surface S1 and a second surface S2 opposite to each other, an RFIC 2 mounted on the first surface S1 side of the base material 1, a first conductor pattern (i.e., CP1 in FIG. 2) formed on the first surface S1 of the base material 1, a first insulator film formed by printing on the first surface S1 of the base material 1 and the surface of the first conductor pattern, a second conductor pattern (i.e., CP2 in FIG. 2) formed by printing on the first insulator film 61 and the first conductor pattern, and a second insulator film 62 covering the surface side of the base material 1 with respect to the first surface S1. The configuration of the upper portion of the base material 1 is substantially the same as that of the RFIC module 101 described in the first embodiment.

Antenna connection terminal electrodes 51 and 52 are formed on the second surface S2 of the base material 1. Interlayer connection conductors V1 and V2, for electrically connecting the antenna-side electrodes 21 and 22, which are a part of the first conductor pattern, and the antenna connection terminal electrodes 51 and 52 to each other, are formed inside the base material 1.

The first conductor pattern, the second conductor pattern, and the interlayer connection conductors V1 and V2 form a matching circuit connected between the RFIC-side electrodes 11 and 12 to which the RFIC 2 is connected and the antenna connection terminal electrodes 51 and 52.

The antenna connection terminal electrodes 51 and are joined to the antenna conductors 71P and 72P by soldering or the like.

In this manner, the RFIC module 102 in which a terminal of the RFIC 2 is drawn out to the antenna connection terminal electrodes 51 and 52 using the conductor through the matching circuit may be formed, and the RFID tag with such a RFIC module 102 directly connected to the antenna conductors 71P and 72P may be formed.

Finally, it is noted that the above description of the exemplary embodiments is illustrative in all respects and not restrictive. Those skilled in the art can make modifications and changes as appropriate.

| REFERENCE SIGNS LIST | |
| --- | --- |
| AP | opening |
| Cp | capacitor |
| CP1 | first conductor pattern |
| CP2 | second conductor pattern |
| L1 | first inductor |
| L2 | second inductor |
| L3 | third inductor |
| L4 | fourth inductor |
| L5 | fifth inductor |
| S1 | first surface |
| S2 | second surface |
| V1, V2 | interlayer connection conductor |
| 1 | base material |
| 2 | RFIC |
| 8 | matching circuit |
| 9 | antenna |
| 11, 12 | RFIC-side electrode |
| 21, 22 | antenna-side electrode |
| 40 | joining material |
| 51, 52 | antenna connection terminal electrode |
| 61 | first insulator film |
| 62 | second insulator film |
| 70 | antenna base material |
| 71, 72 | antenna conductor pattern |
| 71C, 72C | antenna conductor |
| 71L, 72L | antenna conductor |
| 71P, 72P | antenna conductor |
| 101, 102 | RFIC module |
| 201 | RFID tag |

The invention claimed is:

1. A radio frequency integrated circuit (RFIC) module comprising:
   a base material having a first surface and a second surface opposite to each other;
   an RFIC mounted on a first surface side of the base material;
   a first conductor pattern disposed on the first surface of the base material;
   a first insulator film disposed on the first surface of the base material and a surface of the first conductor pattern;
   a second conductor pattern disposed on the first insulator film and the first conductor pattern; and
   a second insulator film covering a surface side of the base material with respect to the first surface,
   wherein the first conductor pattern and the second conductor pattern form a matching circuit connected to an RFIC-side electrode to which the RFIC module is connected.

2. The RFIC module according to claim 1, further comprising an antenna connection terminal electrode disposed on the second surface of the base material.

3. The RFIC module according to claim 2, further comprising an interlayer connection conductor electrically connecting the first conductor pattern to the antenna connection terminal electrode.

4. The RFIC module according to claim 3, wherein the first conductor pattern, the second conductor pattern, and the interlayer connection conductor form the matching circuit that is connected between the RFIC-side electrode and the antenna connection terminal electrode.

5. The RFIC module according to claim 1, wherein the second conductor pattern is directly connected to the first conductor pattern at a position where the first conductor pattern is exposed by the first insulator film.

6. The RFIC module according to claim 5, wherein the first conductor pattern is a copper pattern and the second conductor pattern is a silver paste disposed on the copper pattern.

7. The RFIC module according to claim 1, wherein the first conductor pattern forms the RFIC-side electrode.

8. The RFIC module according to claim 1, wherein the base material is a paper base material.

9. The RFIC module according to claim 1, wherein the second conductor pattern forms a plurality of inductors.

10. A radio frequency identification (RFID) tag comprising:
    an antenna that includes an antenna base material and an antenna conductor pattern disposed on the antenna base material; and
    a radio frequency integrated circuit (RFIC) module including:
      a base material having a first surface and a second surface opposite to each other,
      an RFIC mounted on a first surface side of the base material,
      a first conductor pattern disposed on the first surface of the base material,
      a first insulator film disposed on the first surface of the base material and a surface of the first conductor pattern,
      a second conductor pattern disposed on the first insulator film and the first conductor pattern,
      and a second insulator film covering a surface side of the base material with respect to the first surface,
    wherein the first conductor pattern and the second conductor pattern form a matching circuit connected to an RFIC-side electrode to which the RFIC module is connected.

11. The RFID tag according to claim 10, wherein the RFIC module further includes an antenna connection terminal electrode disposed on the second surface of the base material.

12. The RFID tag according to claim 11, wherein the RFIC module further includes an interlayer connection conductor electrically connecting the first conductor pattern to the antenna connection terminal electrode.

13. The RFID tag according to claim 12, wherein the first conductor pattern, the second conductor pattern, and the interlayer connection conductor form the matching circuit that is connected between the RFIC-side electrode and the antenna connection terminal electrode.

14. The RFID tag according to claim 10, wherein the second conductor pattern is directly connected to the first conductor pattern at a position where the first conductor pattern is exposed by the first insulator film.

15. The RFID tag according to claim 14, wherein the first conductor pattern is a copper pattern and the second conductor pattern is a silver paste disposed on the copper pattern.

16. The RFID tag according to claim 10, wherein the first conductor pattern forms the RFIC-side electrode.

17. The RFID tag according to claim 10, wherein the base material is a paper base material.

18. The RFID tag according to claim 17, wherein the antenna conductor pattern comprises a metal foil.

19. The RFID tag according to claim 10, wherein the second conductor pattern forms a plurality of inductors.

* * * * *